July 31, 1951  C. W. BURNUM  2,562,524
SPRAYING DEVICE FOR AIRCRAFT
Filed May 20, 1947
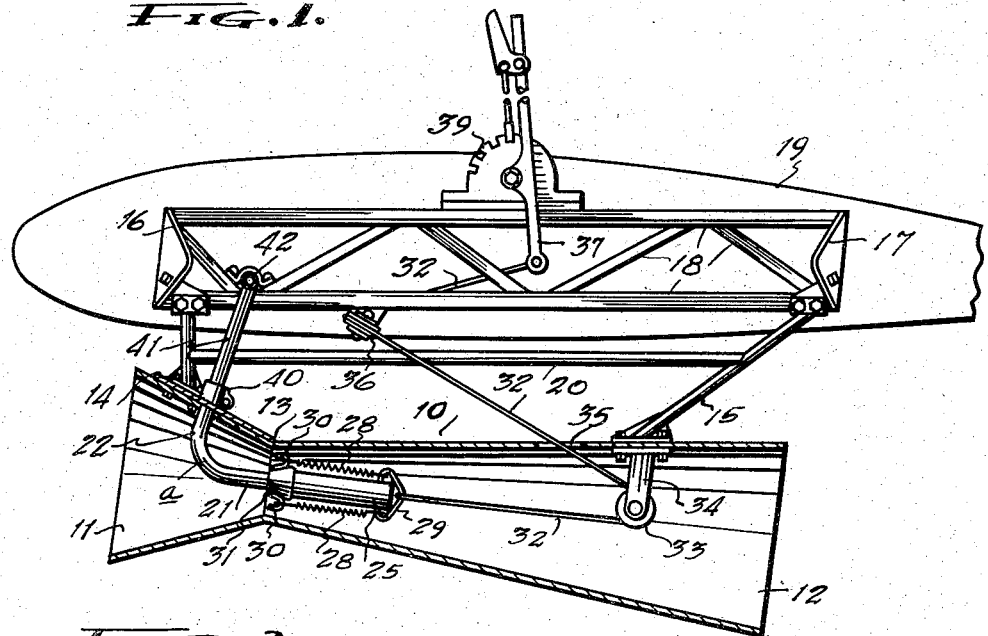
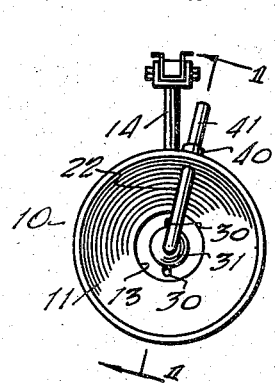
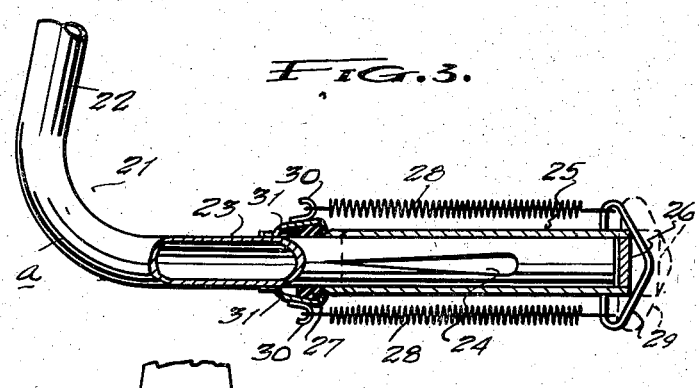
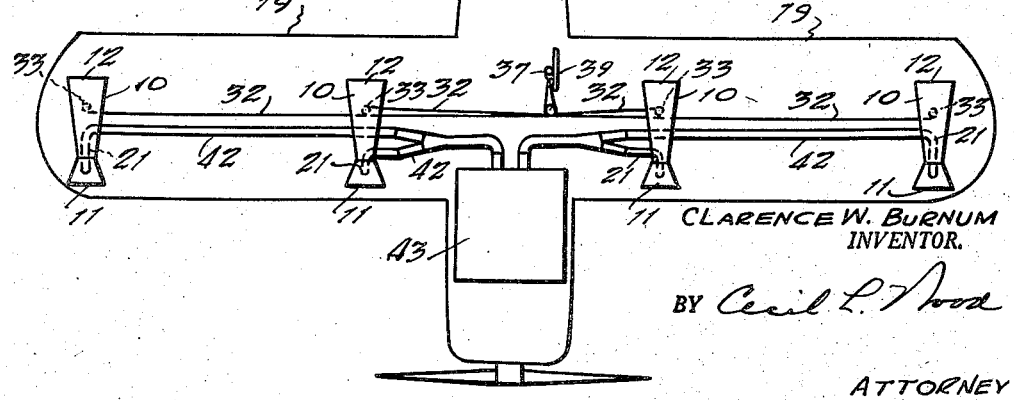
CLARENCE W. BURNUM
INVENTOR.
BY Cecil L. Wood
ATTORNEY Patented July 31, 1951

2,562,524

UNITED STATES PATENT OFFICE 2,562,524

SPRAYING DEVICE FOR AIRCRAFT

Clarence W. Burnum, Arlington, Tex.

Application May 20, 1947, Serial No. 749,389

1 Claim. (Cl. 244—136)

This invention relates to spraying devices for insecticides, chemicals, or the like, for operation in aircraft in the dissemination of insect poisons to growing crops, and general sanitation spraying operations, and the principal object of the invention resides in the provision of a liquid spray distribution valve adapted to be arranged beneath the wings of an aircraft and capable of being manually operated from the cockpit to effect the discharge of the commodity in desirable volume.

An object of the invention is that of providing apparatus for atomizing liquids and discharging the same in predetermined quantities over defined areas, utilizing the force of air currents through a venturi to produce a jetting action on the diffused liquids and direct them over a wide area in the wake of an aircraft equipped with a suitable number of the apparatus.

A still further object of the invention is manifest in the provision of a chemical spraying device embodying a valve capable of being operated to effectively discharge chemical insecticides and disinfectants in controlled volume and adapted for positive shut-off action at will whereby spraying operations can be confined to relatively specific boundaries minimizing the possible hazards of overshooting prescribed areas under treatment and discharging the compounds on adjacent properties where such treatment is undesirable.

Broadly, the invention contemplates the provision of a spraying device of simple and economical design by which all types of chemical spraying operations can be performed, such as the chemical treatment of fields, orchards, lakes, and the like, and in which is afforded accurate and effective control of the products with a minimum of effort and in an economical manner.

While the foregoing objects are paramount, other and lesser objects will become manifest as the description proceeds, taken in connection with the appended drawings wherein:

Figure 1 illustrates the invention in partial longitudinal section, taken on lines 1—1 of Figure 2, showing the same supported beneath the wing of an aircraft, the wing structure being diagrammatically shown.

Figure 2 is a front elevational view of the invention.

Figure 3 is a detail illustration of the valve, shown partially in longitudinal section, and showing the form of the discharge openings, therein, and Figure 4 is a schematic illustration showing a plurality of valves, embodying the invention, arranged on an aircraft shown in outline.

Accordingly, therefore, the invention comprises a Venturi tube 10 formed with flared open ends 11 and 12, its swaged portion 13 being located a relatively short space from the front end 11, as shown in Figure 1. The member 10 is rigidly secured to mounting brackets 14 and 15 by which the assembly is supported by the spars 16 and 17 arranged longitudinally of the wing structures 18.

It is highly desirable that the invention be very rigidly mounted and thus secured against vibration and the force of the air streams passing over the surfaces of the wings 19 in flight, and suitable bracing members 20 may be employed between the brackets 14 and 15. The relative spacing of the tubes 10 from the wings 19 should be minimized to afford suitable rigidity although it is not intended that any particular limitations be applied. The tube 10 is properly positioned by slightly inclining the same rearwardly, as in Figure 1.

A valve assembly, illustrated in detail in Figure 3 is arranged in the tube 10 and comprises a fluid tube 21 which has a bend $a$ providing a substantially right-angular form, one portion 22 being directed upwardly and through the upper wall of the tube 10 in the flared open front end 11 thereof, while the opposite portion 23 extends rearwardly in the tube 10, concentrically through the venturi 13, and into the longer flared portion 12 of the tube 10. A tapered slot 24 is formed in each side of the member 23 and these have their diminishing portions directed toward the forward end 11 of the tube 10, as in Figure 3.

A tubular closure member 25, having its outer end 26 closed, slidably embraces the portion 23 of the member 21 and is adapted to move longitudinally thereof and cover the slots 24. The closure 25 is normally retained against a yieldable seat 27 by a pair of pull springs 28 arranged on opposite sides of the closure 25 and secured at the closed end 26 thereof to a dual bracket member 29 and at their opposite ends to hooks 30 attached to an annular retainer 31 embracing the seat 27 and securing the latter to the tube 21.

It is apparent, therefore, that when the closure 25 is moved away from its seat 27 against the tension of the springs 28 the openings afforded by the slots 24 gradually become larger increasing the flow of liquid therethrough as desired. A cable 32 is attached to the bracket 29 on each of the valve closures 25 and is arranged over a pulley 33 operatively supported on a bracket 34 attached to the upper inner wall of the flared portion 12 of each of the tubes 10, as illustrated in Figure 1 and is arranged through an aperture 35 and upwardly into the wings 19, over a pulley 36 and is connected to a suitable lever 37 in the cockpit of the plane 38.

It is desirable to provide a lever assembly in which the lever 37 is operated on a segment 39 so that variable fixed adjustments of the valve closure 25 can be accomplished. The movement of the closure 25 is illustrated in dotted lines in Figure 3.

The valve assemblies are supported in each of the tubes 10 by the portions 22, of the tubes 21, which are arranged through the tops of the tubes 10 and rigidly secured thereto. The members 22 are connected by flexible couplings 40 to fluid conduits 41 which communicate with pipes 42 connected to the reservoir 43 in the fuselage of the ship 38 and schematically shown in Figure 4. Any suitable installation of the reservoir 43 and connecting conduits 41 and 42 may be employed, however, to supply the liquid compound to the valves.

In practice, the degree to which the slots 24 are opened by the lever 37 will depend upon the type of spraying compound employed in the device and the kind of spraying operations desired. The force of the air streams passing into the open front ends 11 of the tubes 10, through the venturi 13 and expanding through the rear end 12, will produce a very satisfactory diffusing effect upon the liquid compound and cause it to be discharged in the wake of the carrier craft in a fog-like mist, capable of being accurately controlled at all times by the operator.

Manifestly, the structure herein shown and described is capable of considerable changes and modifications by persons skilled in the art without departing from the spirit and intent of the invention or the scope of the appended claim.

What is claimed is:

In a chemical spraying device for aircraft, in combination with a chemical tank carried by said aircraft and discharge conduits therefrom, a Venturi tube arranged about the end of each of said conduits and supported beneath the wings of said aircraft, a discharge slot on each side of each of said conduits within each of said Venturi tubes, the said slots being tapered toward their inner ends, a sliding closure for each pair of said slots normally closing the same under a spring tension, and a cable for operating each of said closures from the cockpit of said aircraft to uncover said slots against said spring tension from their narrower ends.

CLARENCE W. BURNUM.

REFERENCES CITED

The following references are of record in the file of this patent:

UNITED STATES PATENTS

| Number | Name | Date |
|---|---|---|
| 1,580,301 | Johnson | Apr. 13, 1926 |
| 1,957,075 | Morgensen | May 1, 1934 |
| 2,378,985 | Davis | June 26, 1945 |